Oct. 20, 1931.  W. O. ROY  1,828,295
FLOWER HOLDER
Filed Aug. 27, 1929
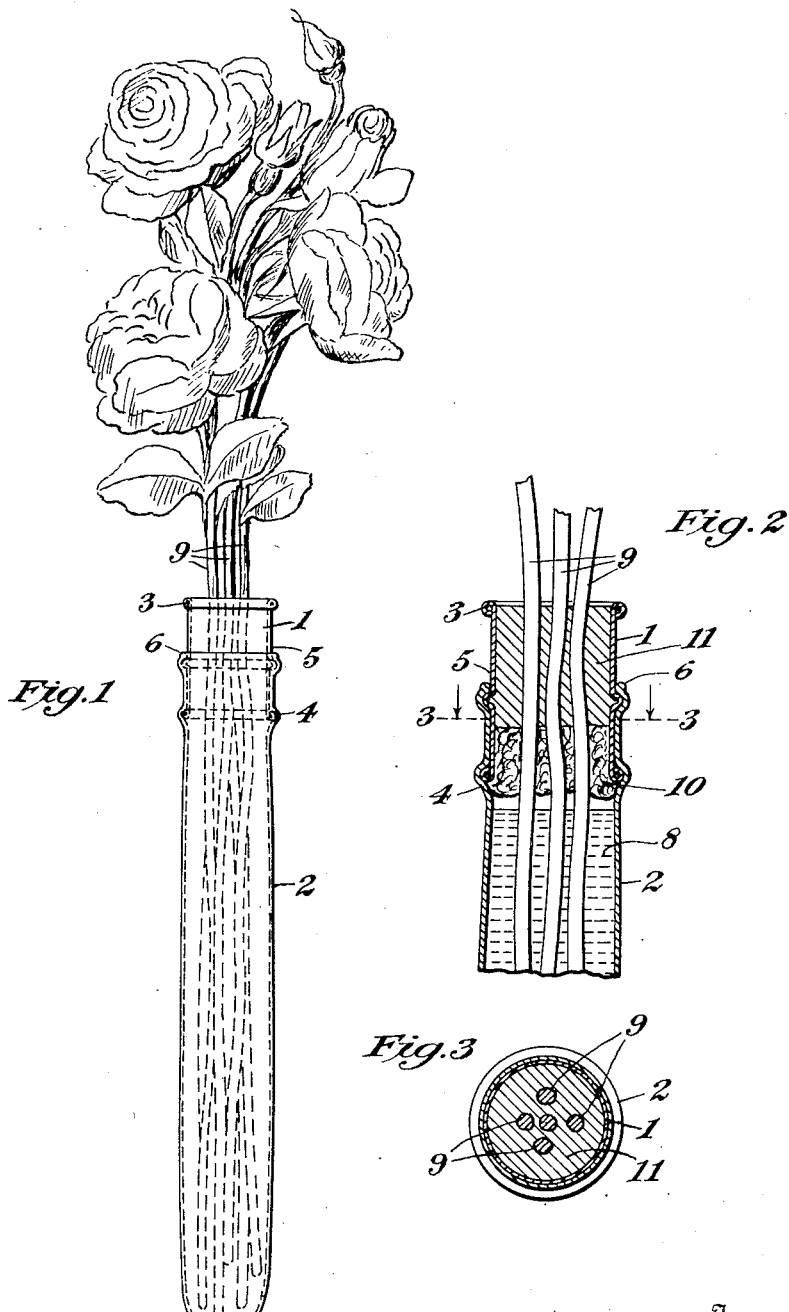
Inventor.
William Ormiston Roy.
By his Attorney
Andrew Wilson.

Patented Oct. 20, 1931

1,828,295

UNITED STATES PATENT OFFICE

WILLIAM ORMISTON ROY, OF MONTREAL, QUEBEC, CANADA

FLOWER HOLDER

Application filed August 27, 1929. Serial No. 388,695.

My invention relates to such holders as are used for the temporary preservation of cut flowers by retaining them in contact with a supply of water, or other refreshing liquid.

Objects of my invention are to provide means whereby the stems of the cut flowers may be held in such positions and under such conditions that a supply of water will be furnished to them irrespective of the position in which the flowers and the holder may be laid, and to do this in such a way that the water may be freely taken up by the flowers without producing a downward suction or pull on their stems or the influx of air into the receptacle from which the water is taken up.

Another object of my invention is to provide a holder which shall be flexible, and of a neat form which will lend itself to use for the holding of flowers for personal adornment for instance, corsage bouquets and the like; another object of my invention is to provide means whereby pressure may be applied to the water so as to urge it up into the stems of the flowers for the more efficient serving of the water to the flowers.

These and other advantages of my invention will be hereinafter more fully explained and pointed out.

In the drawings Figure 1 is an elevation of my improved flower holder, showing it as holding a selection of cut flowers; Figure 2 is a vertical sectional view of the same, the lower portion being broken off; Figure 3 is a cross sectional view taken on the line 3—3 of Fig. 2, looking down.

A hollow neck 1, preferably of spun metal or the like, is provided with means whereby the bag-like body 2 of the holder may be securely attached to the neck. In the drawings I have shown the neck as provided with beads 3, 4 at its opposite ends and with an intermediate bead 5 running around it.

The body 2 is preferably formed of rubber or a similar flexible water-tight material. In the drawings I have shown this body in the form of an elongated sack of comparatively thin rubber having a neck, preferably finished at its outer end with a strengthening bead 6 adapted to contract tightly around the neck 1 above the bead 5. Below the bead 5 the body 2 hubs closely around the neck 1 spreading slightly to pass around the bead 4. This portion of the sack-body 2 may be further secured to the neck 1 by a suitable cement if that is desired. The arrangement is such as to make a water-tight and air-tight connection between the rigid neck 1 and the flexible sack-body 2.

In use the sack-body is filled with water 8 and flower stems 9, 9, are passed down into the sack-body. Preferably a packing 10, such as moss or the like, is inserted around the stems of the flowers near the lower end of the neck, to form a sort of dam; and then a sealing element 11 of suitable material, for instance melted wax or a viscid or plastic cement which will readily harden or set, is poured into the neck 1 around and between the stems 9, 9 so as to fill up the neck, above the dam 10, and make a tight seal around the stems and between them and the neck of the holder. It will be understood that this sealing material must be of a character which will not injuriously effect the stems so as to interfere with the natural course of the water up through them to the blooms.

When the sealing element 11 has set the flower stems will be securely held in proper position, their portions within the sack-body being immersed in the water contained in it. The flowers and their holder may now be laid in any position without the water escaping from around the flower-stems, which is a great advantage in the actual handling of cut flowers for sale in bouquets or for use by purchasers; for the flowers are kept constantly fresh, and are also assembled in neat and attractive bouquet form. If desired the sack-body may be made quite attenuated, and may be made of a suitable color which will harmonize with the green of foliage, or the color of the flowers, or the costume of one who may be carrying or wearing the flowers.

As the water is taken up by the flower stems the sack-body gradually collapses, so that no partial vacuum is created within it by the outflow of the water, and no down-suction is exerted through the flower stems or through the sealing element. This is very important. For if the holder could not collapse in this way and compensate for the loss of water out of it a partial vacuum must be formed within it with the tendency to hold back and stop the passage of the water up through the stems, or even the suction of air down through the stems or the sealing element, so that the blooms would be deprived of the free passage of water to them through the stems.

Besides, if it is desired, pressure may be exerted upon the sack-body, as by the closing of a hand around it with the result of pressing, forcing or pumping the water up through the stems thus accelerating its course toward the foliage and blooms.

I desire it to be understood that the form of the container might be varied, and, if desired, more than one neck could be placed in the sack-body at different points, so that a plurality of groups of flowers might be carried by one container. This feature of my invention permits its use for floral designs, and renders it peculiarly adapted for use in such places as cemeteries where it is desired to have the flowers retain their freshness as long as possible without requiring frequent watering or the use of special vases or other conventional water holders to supply the flowers with water.

I desire it to be understood that the form of container illustrated in the drawings, is, therefore, typical but not exclusive. For it is obvious that details may be modified as by the use of equivalents without departing from the spirit of my invention as claimed.

Having thus described my invention what I claim and desire to secure by Letters Patent of the United States is:—

1. A flower holder comprising a flexible sack-body provided with an open neck element adapted to allow the passage of flower stems through it and into the sack-body, and a plastic sealing element closing the space between the stems and the inner face of the neck.

2. A flower holder comprising a flexible sack-body provided with an open neck element adapted to allow the passage of flower stems through it and into the sack-body, a packing element in the lower part of the neck around the flower stems, and a plastic sealing element above and resting upon the packing element closing the space between the stems and the inner face of the neck.

3. A flower holder comprising an attenuated, elastic sack-body provided with a metallic, open neck element adapted to allow the passage of flower stems through it and into the sack-body, and a plastic sealing element closing the space between the stems and the inner face of the neck.

4. A flower holder comprising a collapsible sack-body adapted to contain water, an opening into the sack-body adapted to permit the insertion of flower stems; and means for hermetically closing the space within the opening between and around the stems, whereby the water may be drawn up by the flower stems without creating back suction in the container.

WILLIAM ORMISTON ROY.